(12) United States Patent
Yamamoto

(10) Patent No.: US 6,429,993 B1
(45) Date of Patent: Aug. 6, 2002

(54) MAGNETIC RECORDING AND PLAYING BACK APPARATUS

(75) Inventor: Yukihiro Yamamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/408,049

(22) Filed: Sep. 29, 1999

(30) Foreign Application Priority Data

Sep. 29, 1998 (JP) .......................................... 10-274952

(51) Int. Cl.[7] .............................................. G11B 15/18
(52) U.S. Cl. ....................................................... 360/69
(58) Field of Search .......................... 360/69, 132, 94, 360/71; 242/347, 344

(56) References Cited

U.S. PATENT DOCUMENTS 5,390,870 A * 2/1995 Sawada et al. ............. 242/344
5,481,415 A * 1/1996 Oguro ........................ 360/69
5,726,817 A * 3/1998 Oguro et al. ................ 360/25

* cited by examiner

Primary Examiner—David Hudspeth
Assistant Examiner—K. Wong
(74) Attorney, Agent, or Firm—Ratner & Prestia

(57) ABSTRACT

A magnetic recording and playing back apparatus includes the following elements: (a) a loading controller for instructing a mechanism to pull a tape out of a cassette, (b) a reel controller for instructing a reel to apply a back tension when the tape is loaded, (c) an ID board detector for determining a kind of tape based on information from the ID board, and (d) another controller for changing the back tension to be applied to the tape by the reel controller responsive to the kind of tape determined by the ID board detector. This construction allows the apparatus to lower the back tension when a cleaning tape of which frictional coefficient is high is loaded. As a result, the apparatus can accommodate a cassette tape regardless of a tape characteristic.

3 Claims, 3 Drawing Sheets

MAGNETIC RECORDING AND PLAYING BACK APPARATUS

FIELD OF THE INVENTION

The present invention relates to magnetic recording and playing back apparatuses, and more particularly it relates to video tape recorders (VTR) which can record and playback information with a tape packed in a cassette equipped with an ID board.

BACKGROUND OF THE INVENTION

In recent years, digital VTRs have prevailed not only in professional uses but also in consumers' households, and the certain consumers frequently use digital VTRs to their entertainment. This digital VTR employs a digital video cassette and digital video mini-cassette in accordance with a relevant standard. The cassette rear plate where a label is pasted has an ID board including four terminals.

A conventional magnetic recording and playing back apparatus is described hereinafter.

In FIG. 3, mechanism 311 is constructed as follows: Rotary-head-drum 321 includes a magnetic head (not shown) for recording or playing back information such as audio and video signals. Drum 321 spins at a given rotating speed. Cassette housing 327 houses a magnetic tape such as a metal evaporated tape (ME tape) or a metal particle tape (MP tape). Housing 327 can also houses a cleaning tape.

Supply reel 317 and take-up reel 319 transport the tape packed in the cassette housing 327. When the housing 327 is loaded into a VTR, loading posts 313 move from positions 315 to the marked positions thereby pulling the tape out of the housing 327 and winding the tape around drum 321.

Loading controller 323 instructs loading posts 313 to move the tape. Reel controller 325 instructs supply reel 317 and take-up reel 319 to spin, and at the same time, it also strengthens or moderates a back tension applied to the tape. Controller 329 instructs loading controller 323 to load the cassette tape into the VTR, or instructs reel controller 325 to spin the reel.

An operation of the conventional VTR thus constructed is described hereinafter.

When cassette housing 327 is loaded to mechanism 311 of the VTR, a motor (not shown) coupled to rotary-head-drum 321 is driven, whereby drum 321 starts to spin at a given rotating speed. Reel controller 325 applies a given tape tension (back tension) to the tape, and loading controller 323 instructs posts 313 to pull the tape from locations 315 and wind the tape around drum 321 covering a given angle on drum 321.

When a cleaning tape is loaded, posts 313 sometimes fail to pull the cleaning tape out of housing 327, or the tape loading is not completed because drum 321 is prevented from being spun. This troublesome case is described hereinafter. In this case, controller 329 firstly instructs loading controller 323 to unload the tape in order to avoid damaging the tape. Loading controller 323 follows the instruction and retracts posts 313 to positions 315, thereby restoring the tape into the cassette.

However, the conventional construction described above applies a given back tension to a tape regardless of tape characteristics, so that a difference between the frictional coefficients of different kinds of tapes causes the troubles described above. As a result, the heads of the VTR are not cleaned anymore.

A reason why the cleaning tape cannot be pulled out of the cassette is this: the back tension applied to the cleaning tape by reel controller 325 at the loading is stronger than a force of posts 313 pulling out the tape by loading controller 323. When a back tension is applied by reel controller 325 based on the ME tape or MP tape having a low surface frictional coefficient, the cleaning tape of which frictional coefficient is high encounters resistance at both the reels in loading. As a result, the cleaning tape cannot be smoothly pulled out of reels 317 and 319. The resistance and the back tension eventually halt the loading operation of posts 313.

A reason why drum 321 halts to spin is also a back tension applied to the cleaning tape and resistance due to high frictional coefficient of the cleaning tape. These two factors prevent drum 321 from spinning when the cleaning tape winds around drum 321, and eventually halt drum 321 to spin.

SUMMARY OF THE INVENTION

The present invention addresses the problems discussed above, and aims to provide a magnetic recording and playing back apparatus having a function to determine a kind of tape and to change a back tension applied to a tape responsive to the kind of tape.

The magnetic recording and playing back apparatus of the present invention can accommodate a cassette on which an ID board is equipped, and from the ID board characteristics of the tape packed in the cassette can be detected. The apparatus comprises the following elements:

(a) a loading controller (a first controller) for instructing a mechanism to pull a tape out of a cassette;

(b) a reel controller (a second controller) for instructing a reel to spin so that a back tension is applied to the tape when the tape is loaded;

(c) an ID board detector for determining a kind of tape based on information from the ID board; and (d) a third controller for varying the back tension to be applied by the reel controller to the tape responsive to the kind of tape determined by the ID board detector.

This construction allows the magnetic recording and playing back apparatus to accommodate a cassette tape regardless of the tape characteristics.

DETAILED DESCRIPTION OF THE INVENTION

Figure 1:
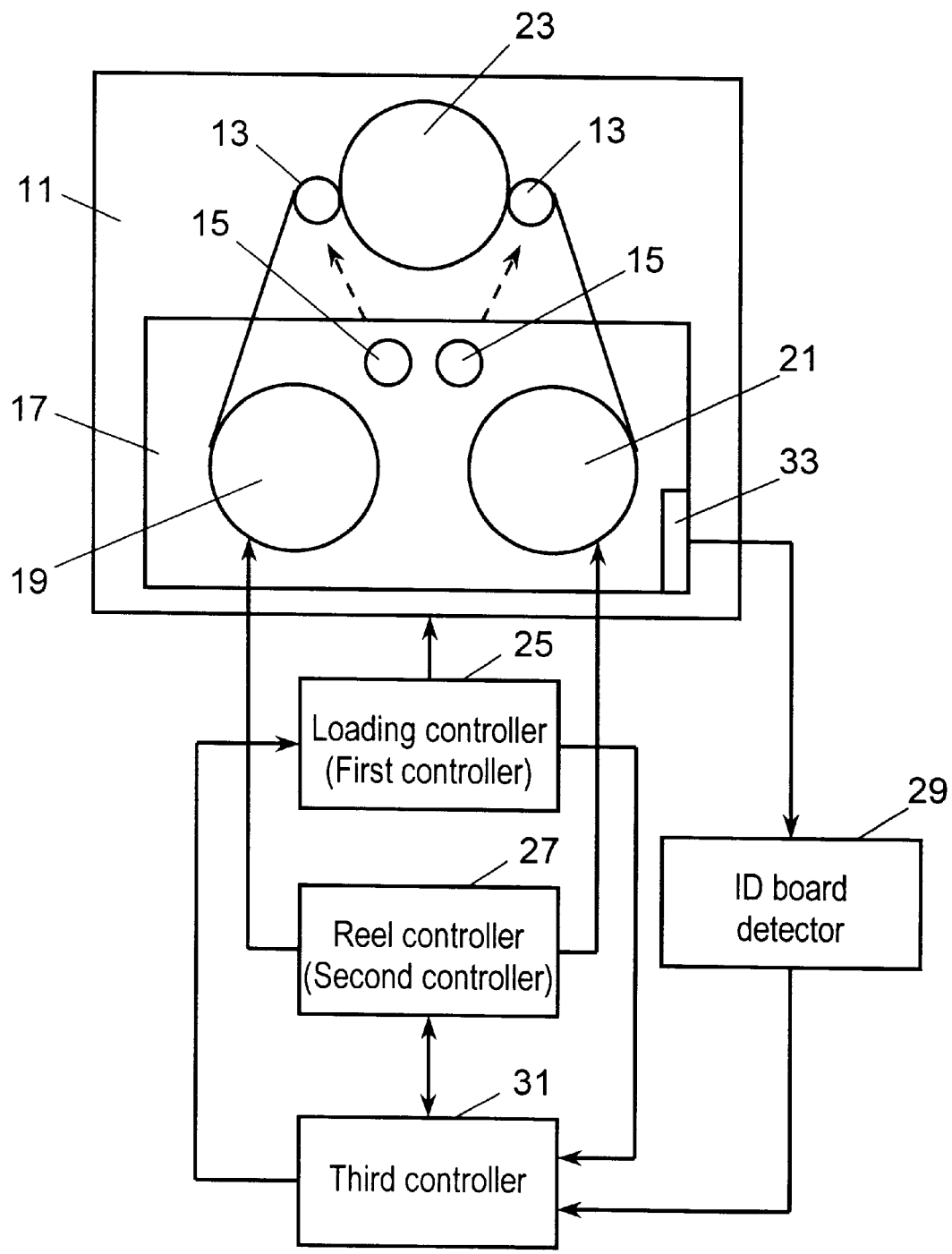
FIG. 1 is a block diagram depicting a structure of a recording and playing back apparatus in accordance with an exemplary embodiment of the present invention.

An exemplary embodiment of the present invention is demonstrated hereinafter with reference to the accompanying drawings. FIG. 1 is a block diagram depicting a structure of a recording and playing back apparatus in accordance with the exemplary embodiment.

In FIG. 1, mechanism 11 of a digital VTR is constructed as follows.

Rotary-head-drum 23 includes magnetic heads (not shown) for recording and playing back information such as video and audio signals. Drum 23 spins at a given speed. Digital video cassette 17 packs magnetic tape therein and is in accordance with the digital video standard. Supply reel 19 and take-up reel 21 transport the tape packed in cassette 17. When the tape is loaded, loading posts 13 move from positions 15 in the cassette to the marked positions along the broken lines, thereby pulling the tape out of the cassette 17 and winding the tape around drum 23 covering a given angle on drum 23.

ID board 33 is equipped on a side face of cassette 17 and able to recognize characteristics of different kinds of tapes. ID board 33 can be also equipped on a rear face of cassette 17.

Loading controller 25 (first controller) instructs post 13 to pull/restore the tape. Reel controller 27 controls supply reel 19 and take-up reel 21 to spin, and also strengthens or moderates a back tension applied to the tape.

ID board detector 29 detects a resister value of ID board 33 thereby determining a kind of tape such as an ME tape, MP tape or cleaning tape. This detection can be in a contact manner or a non-contact manner.

Controller 31 (a third controller) instructs reel controller 27 (a second controller) to change a back tension applied to the tape according to a loading completion report by loading controller 25 as well as a determination report on a kind of tape by ID board detector 29. Controller 31 also instructs loading controller 25 to load the tape.

A detecting operation of ID board detector 29 is demonstrated hereinafter.

Figure 2:
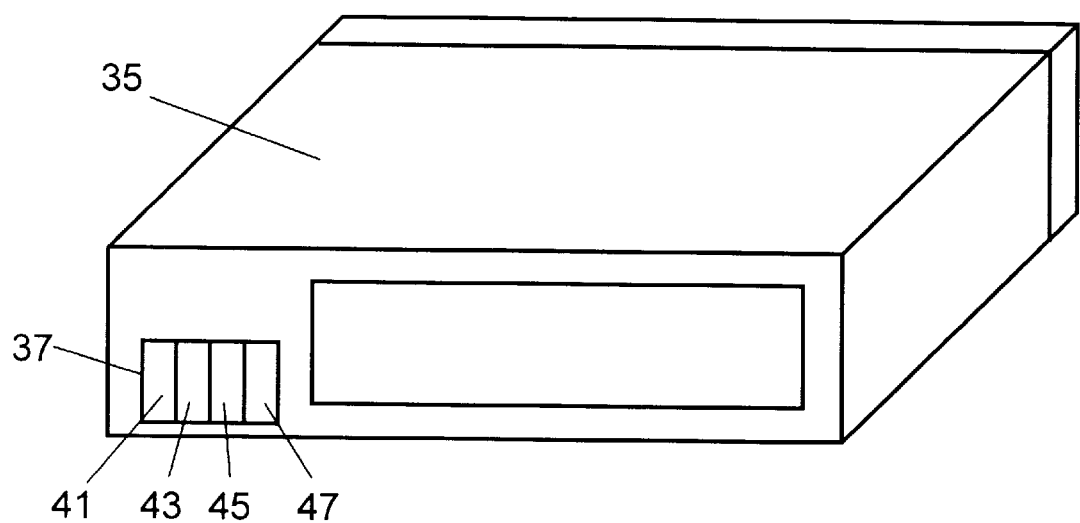
FIG. 2 is a perspective view depicting an outlook of a digital video cassette.
Figure 3:
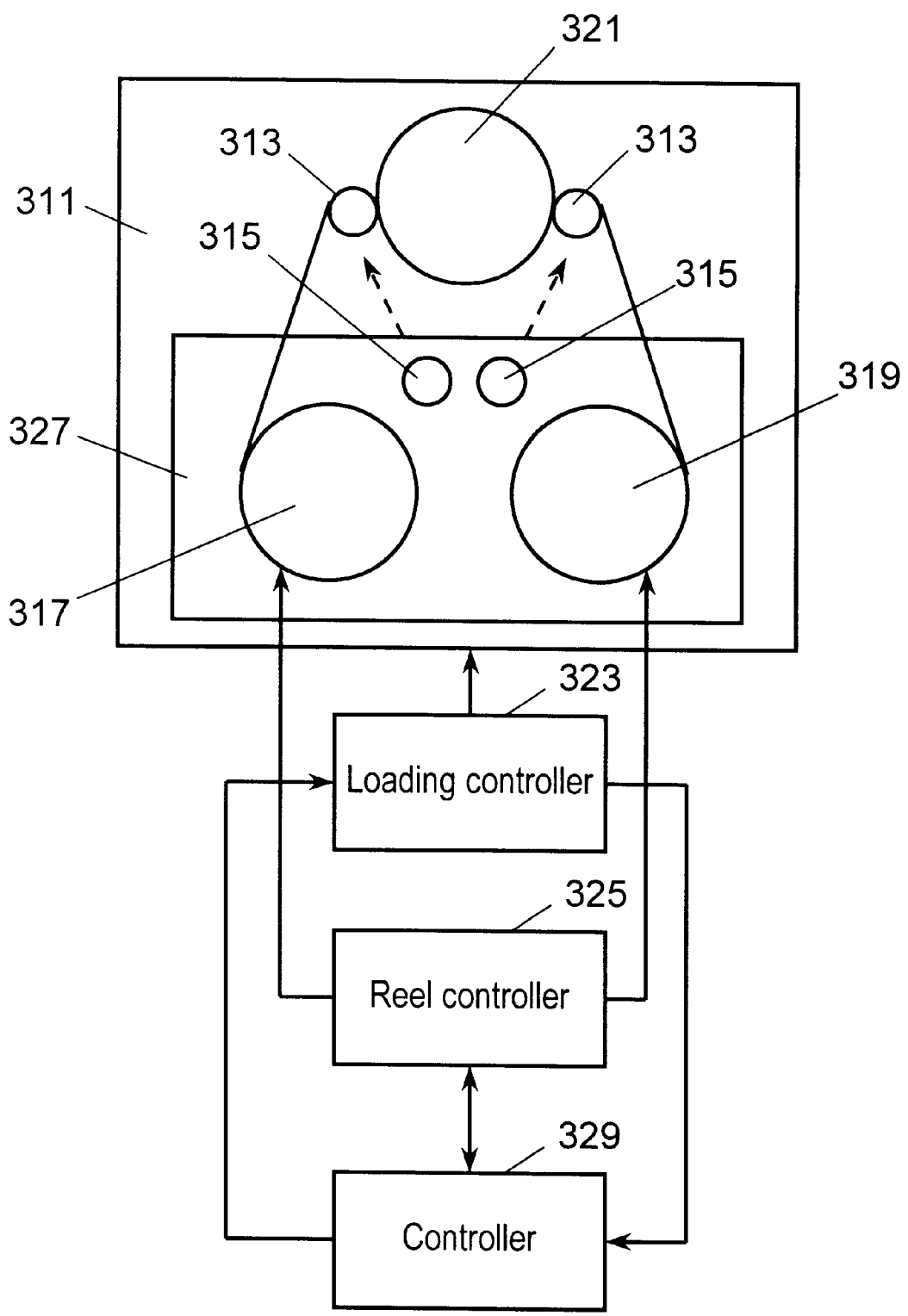
FIG. 3 is a block diagram depicting a structure of a conventional magnetic recording and playing back apparatus.

FIG. 2 is a perspective view of a digital video cassette. ID board 33 in FIG. 1 is equipped on a side face of cassette 17; however, ID board 37 in FIG. 2 is equipped on a rear face of cassette 35. ID board 37 has terminals 41, 43, 45 and 47. Contacting elements are provided on the VTR side so that these terminals contact with the respective contacting elements, whereby the basic information of cassette 35 is recognized.

Terminal 41 contains the information about a tape thickness. In other words, when terminal 41 indicates a resister value over 22 k ohm, or when the counterpart contacting element on the VTR side cannot contact with the terminal 41, the thickness of the packed tape is recognized 7 mm the standardized value.

Terminal 43 contains the information about a tape type, i.e. when terminal 41 indicates a resister value over 22 k ohm, or when the counterpart contacting element on the VTR side cannot contact with the terminal 43, the type of the packed tape is determined the ME tape. When terminal 43 indicates 0.8 k–2.9 k ohm, the tape is determined the cleaning tape. When it indicates less than 0.49 k ohm, the tape is determined the MP tape.

Terminal 45 contains the information about a tape grade, i.e. when terminal 45 indicates a resister value over 22 k ohm, or when the counterpart contacting element on the VTR side cannot contact with the terminal 45, the tape packed in the cassette is determined a consumer grade. When it indicates 3.7 k–13.2 k ohm, the tape is determined a professional grade.

Terminal 47 is a grounding terminal.

The tape characteristics are thus determined through the respective terminals.

An operation of the magnetic recording and playing back apparatus thus constructed is demonstrated with reference to FIG. 1.

The first case is that cassette 17 packing the ME tape or MP tape therein is loaded into mechanism 11 of the VTR. When cassette 17 is loaded, a motor (not shown) coupled to rotary-head-drum 23 spins, thereby drum 23 starts to spin at a given rotating speed. Reel controller 27 applies a back tension to the tape so that the tape does not loosen, and loading controller 25 instructs loading post 13 to pull the tape from positions 15 and wind the tape around drum 23 to cover a given angle thereon.

The back tension applied to the tape by reel controller 27 is an initial back-tension-value of this VTR. When the tape is loaded, ID board detector 29 determines a kind of tape based on the resistor value of ID board 33 and outputs the resultant kind to third controller 31. In this case, the resultant kind is either the ME tape or MP tape. Since detector 14 determines that the tape loaded is either the ME tape or MP tape, controller 31 instructs reel controller 27 to run the tape by applying the initial value of back tension to the tape.

As such, when the ME tape or MP tape is loaded, mechanism 11 can pull the tape out of cassette 17 smoothly, and drum 23 spins free from obstacle.

The second case is that the cassette packing the cleaning tape therein is loaded.

When this cassette is loaded, drum 23 starts to spin at the given speed following the motor, which is the same operation discussed above. Then reel controller 27 applies the initial-back-tension value to the cleaning tape, and loading controller 25 instructs loading post 13 to pull the cleaning tape from positions 15 and wind the tape around drum 23 so that the tape covers a given angle on drum 23. ID board detector 29 reads the tape information from the resistor value of ID board 33 and outputs the determination to the third controller 31.

Since detector 29 determines that the loaded tape is the cleaning tape, controller 31 instructs loading controller 25 and reel controller 27 to restore the cleaning tape into cassette 17.

Here is a reason for this. A cleaning tape has a higher surface-frictional-coefficient than the ME tape or MP tape. Therefore, when the cleansing tape is loaded, resistance occurs at both reels 19 and 21 due to the higher frictional coefficient. The resistance and the back tension hinder loading post 13 from pulling the tape smoothly out of the cassette 17, or these two factors prevent drum 23 from spinning and eventually stop drum 23 to rotate.

In this exemplary embodiment, controller 31 instructs loading controller 25 and reel controller 27 to restore the cleaning tape into cassette 17, and then controller 31 instructs reel controller 27 to load the cleaning tape at a back tension lower than the initial back tension. Due to the lower back tension, the cleaning tape can be smoothly pulled out of cassette 17 and wound around drum 23 without hindering drum 23 to spin.

As discussed above, the magnetic recording and playing back apparatus of the present invention can change the back tension to a lower value when a cleaning tape having a higher frictional coefficient than other tapes is loaded, whereby the cleaning tape can be loaded free from troubles.

What is claimed is:

1. A magnetic recording and playing back apparatus being able to accommodate a tape cassette equipped with an ID board, from which information about a tape packed in the cassette is detectable, said apparatus comprising:

a loading controller for controlling a mechanism to move the tape out of the cassette;

a reel controller for controlling spin of a reel for applying a back tension to the tape when the tape is loaded into said apparatus;

an ID board detector for determining a kind of tape based on information from the ID board; and another controller for changing the back tension to be applied to the tape by said reel controller responsive to the kind of tape determined by said ID board detector.

2. The magnetic recording and playing back apparatus as defined in claim 1 wherein said another controller lowers the back tension applied by said reel controller when a loaded tape has a higher frictional coefficient, and raises the back tension applied by said reel controller when the loaded tape has a lower frictional coefficient.

3. The magnetic recording and playing back apparatus as defined in claim 2 wherein the tape having the higher frictional coefficient is a cleaning tape, and the tape having the lower frictional coefficient is one of ME tape and MP tape.

\* \* \* \* \*